(12) United States Patent
Kirchen et al.

(10) Patent No.: US 10,513,330 B2
(45) Date of Patent: Dec. 24, 2019

(54) BLADE DAMPER WITH A MAGNETIC CONTAMINANTS TRAP

(71) Applicant: Sikorsky Aircraft Corporation, Stratford, CT (US)

(72) Inventors: Adrial Kirchen, Stamford, CT (US); James Orbon, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 458 days.

(21) Appl. No.: 15/516,442

(22) PCT Filed: Aug. 3, 2015

(86) PCT No.: PCT/US2015/043397
§ 371 (c)(1),
(2) Date: Apr. 3, 2017

(87) PCT Pub. No.: WO2016/053464
PCT Pub. Date: Apr. 7, 2016

(65) Prior Publication Data
US 2018/0229836 A1 Aug. 16, 2018

Related U.S. Application Data

(60) Provisional application No. 62/059,386, filed on Oct. 3, 2014.

(51) Int. Cl.
*B64C 27/51* (2006.01)
*B64C 27/635* (2006.01)
*B03C 1/30* (2006.01)

(52) U.S. Cl.
CPC ............ *B64C 27/51* (2013.01); *B03C 1/30* (2013.01); *B64C 27/635* (2013.01)

(58) Field of Classification Search
CPC ......... B64C 27/51; B64C 27/635; B03C 1/30; F04B 53/20; F15B 21/041
See application file for complete search history.

(56) References Cited

U.S. PATENT DOCUMENTS 2,603,103 A * 7/1952 Sohon ............... F16F 15/31
74/573.1
2,936,893 A 5/1960 Arkoosh et al.
(Continued)

OTHER PUBLICATIONS

ISR/WO, dated Mar. 2, 2016, PCT Application No. PCT/US15/43397, 12 pages.
(Continued)

*Primary Examiner* — Carlos A Rivera
*Assistant Examiner* — Wayne A Lambert
(74) *Attorney, Agent, or Firm* — Cantor Colburn LLP

(57) ABSTRACT

A blade damper with a magnetic contaminants trap includes, a housing defining a cavity, a piston in operable communication with the housing dividing the cavity into at least a first chamber and a second chamber, a passageway in operable communication with the cavity configured to allow fluid within the cavity to move between the first chamber and the second chamber through the passageway, and at least one magnet in operable communication with fluid in at least one of the cavity and the passageway, such that magnetic contaminants are prevented from freely moving about within the fluid after having been attracted toward the at least one magnet by a magnetic field of the at least one magnet.

12 Claims, 3 Drawing Sheets

(56) References Cited

U.S. PATENT DOCUMENTS

| | | | | |
|---|---|---|---|---|
| 4,519,906 A * | 5/1985 | Hikosaka | ............... | B01D 29/46 210/223 |
| 4,616,740 A * | 10/1986 | Okamoto | ............... | F16D 37/02 192/21.5 |
| 5,089,128 A * | 2/1992 | Garaschenko | ......... | B01D 35/06 210/222 |
| 5,152,372 A | 10/1992 | Volman | | |
| 5,277,281 A * | 1/1994 | Carlson | ................. | F16F 9/535 188/267 |
| 5,702,598 A | 12/1997 | Lemon et al. | | |
| 5,984,056 A * | 11/1999 | Agnihotri | ............... | F16F 15/03 188/267.2 |
| 6,131,709 A * | 10/2000 | Jolly | ........................ | F16F 9/20 137/909 |
| 6,270,667 B1 * | 8/2001 | Nakamura | ............. | B01D 35/06 184/6.25 |
| 6,576,128 B1 * | 6/2003 | Jackson | ................ | B01D 35/06 184/6.25 |
| 7,434,764 B2 | 10/2008 | Lappos et al. | | |
| 7,604,748 B2 | 10/2009 | Newman et al. | | |
| 8,387,644 B2 * | 3/2013 | Najmolhoda | ............ | F01L 1/34 123/90.17 |
| 8,413,773 B2 | 4/2013 | Anderfaas et al. | | |
| 8,845,893 B2 * | 9/2014 | Marchand | ..................... | 210/222 |
| 9,517,473 B2 * | 12/2016 | Marchand | ............ | B03C 1/0332 |
| 2003/0012650 A1 | 1/2003 | Ferullo | | |
| 2007/0045068 A1 * | 3/2007 | Namuduri | ............... | F16F 9/535 188/267 |
| 2009/0294231 A1 * | 12/2009 | Carlson | .................. | F16F 9/537 188/267.2 |
| 2011/0155841 A1 | 6/2011 | Cranga et al. | | |
| 2013/0216401 A1 * | 8/2013 | Kawano | .................. | F04B 23/08 417/205 |
| 2015/0093245 A1 * | 4/2015 | Fuhrer | ................... | B64C 27/32 416/106 |
| 2015/0270044 A1 * | 9/2015 | Noma | ..................... | H01F 1/447 192/21.5 |

OTHER PUBLICATIONS

Stephen Mraz, "Magnetic filter keeps fluids clean"; Machine Design; Jun. 16, 2005; accessed from http://machinedesign.com/archive/magnetic-filter-keeps-fluids-clean on Jul. 17, 2014; 2 pages.

Tom Hulme, "From a Can of Beans to Grand Prix Race Wins—Introducing the Full-flow Magnetic Flux Filter"; Machine Lubrication; Jan. 2015; accessed from http://www.machinerylubrication.com/Read/710/magnetic-filter-flow on Jul. 17, 2014; 4 pages.

* cited by examiner

BLADE DAMPER WITH A MAGNETIC CONTAMINANTS TRAP

This application claims the benefit of PCT Application No. PCT/US15/43397, filed on Aug. 3, 2015, which in turn claims priority to U.S. provisional patent application Ser. No. 62/059,386, filed Oct. 3, 2014. The entire contents of PCT Application No. PCT/US15/43397 and U.S. provisional patent application Ser. No. 62/059,386 are incorporated herein by reference.

STATEMENT OF FEDERALLY SPONSORED RESEARCH OR DEVELOPMENT

This invention was made with government support with the U.S. Government under Contract No. N00019-06-C-0081 with the United States Navy. The government therefore has certain rights in this invention.

BACKGROUND OF THE INVENTION

Hydraulic main rotor blade dampers, as are used on helicopters for example, typically do not employ conventional filters to remove contaminants from hydraulic fluid housed therein due to among other things the undesirable weight that would necessarily be added. Consequently, wear causes contamination that subsequently acts as an abrasive that can contribute to premature failure of seals and dynamic sliding surfaces within the device. Since repairing and replacing these components is costly the art would be receptive to methods and devices that lengthen the operational life of these components.

BRIEF DESCRIPTION OF THE INVENTION

Disclosed herein is a blade damper with a magnetic contaminants trap. The damper includes, a housing defining a cavity, a piston in operable communication with the housing dividing the cavity into at least a first chamber and a second chamber, a passageway in operable communication with the cavity configured to allow fluid within the cavity to move between the first chamber and the second chamber through the passageway, and at least one magnet in operable communication with fluid in at least one of the cavity and the passageway, such that magnetic contaminants are prevented from freely moving about within the fluid after having been attracted toward the at least one magnet by a magnetic field of the at least one magnet.

Further disclosed herein is a helicopter. The helicopter includes, a plurality of blade assemblies and a rotor hub having one of the blade dampers disclosed herein in operable communication with each of the plurality of blade assemblies.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
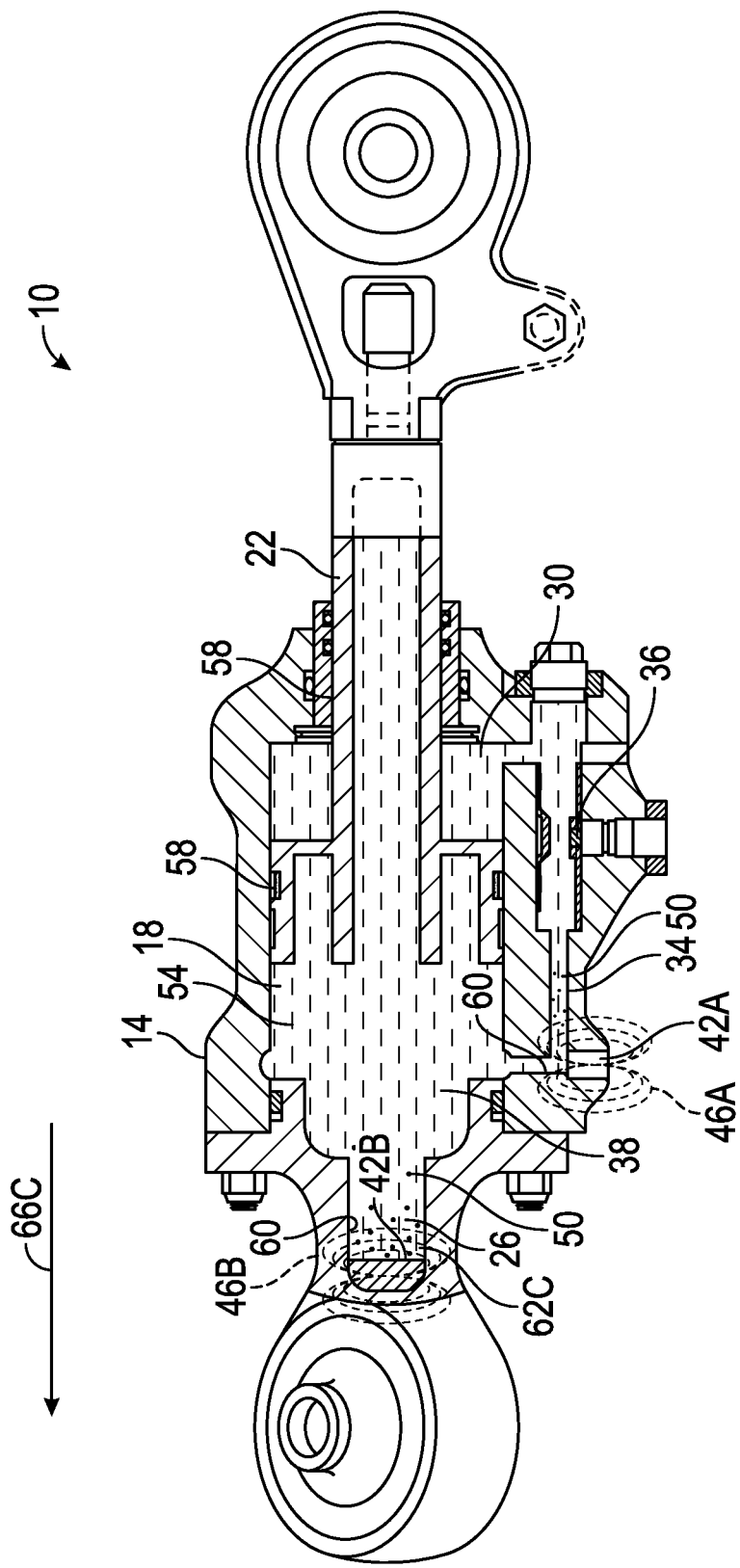
FIG. 1 depicts a partial cross sectional view of a blade damper disclosed herein.

Referring to FIG. 1, an embodiment of a blade damper 10 with a magnetic contaminants trap operating in a centrifugal environment creating a centrifugal force in a first direction is disclosed herein. The blade damper 10 experiences a centrifugal load along the lines of the arrow 66C, which is shown as substantially parallel to the direction of movement for the damper 10. However, it is understood that aspects of the invention can have the centrifugal load direction 66C that need not be substantially parallel to the direction of movement for the damper 10 in all aspects of the invention.

The blade damper 10 includes, a housing 14 defining a cavity 18, a piston 22 in operable communication with the housing 14 that divides the cavity 18 into at least a first chamber 26 and a second chamber 30. A passageway 34 formed in part in the housing 22 in the one embodiment, is fluidically connected to both the first chamber 26 and the second chamber 30. The passageway 34 is configured to allow fluid 38 within the cavity 18 to move between the first chamber 26 and the second chamber 30 through the passageway 34. A restriction 36 may be positioned within the passageway 34 to slow a flow rate therethrough to dampen movement of the piston 22 relative to the housing 14. The restriction 36, as used herein, refers to one or multiple valves, orifices or other devices that can slow flow rates between the chambers 26 and 30. Additionally, the restrictions 36 can be in more than just the one passageway 34 illustrated in the embodiment of FIG. 1 including through a passageway (not shown) in the piston 22 directly. At least one magnet 42A, 42B (with two magnets being shown in FIG. 1) has a magnetic field 46A, 46B that extends at least partially into the one or both of the cavity 18 and the passageway 34, such that magnetic contaminants 50 (i.e. contaminants that are attracted to a magnetic field 46), are prevented from freely moving about within the fluid 38 after having been attracted toward the at least one magnet 42A, 42B by the magnetic field 46A, 46B.

The cavity 18 and passageway 34 together form a closed system for containing the fluid 38. Therefore, any debris 54 in the fluid 38 that is not initially built into the system is primarily generated by wear of the housing 14, the piston 22, and seals 58 that slidably engage with one or both of the housing 14 and the piston 22. Hard and abrasive particles in the debris 54 are more of a concern than softer less abrasive particles since they can accelerate wear that can cause damage that may result in leaks. Analysis has shown that a majority of the hard and abrasive particles found in the fluid 38 of conventional blade dampers include iron, cobalt and nickel that are attracted to magnets and thus make up the magnetic contaminants 50 discussed herein.

The magnetic contaminants 50 once formed are initially free to move about within the fluid 38. Whenever the magnetic contaminants 50 are circulated within one of the magnetic fields 46A, 46B, magnetic forces urge the contaminants 50 toward the magnet 42A, 42B that is generating the respective magnetic field 46A, 46B. If the magnetic field 46A, 46B developed by the magnet 42A, 42B is sufficiently strong to overcome the viscous fluid forces acting on the contaminants 50 as they are circulated within the damper's chambers 26 or 34 and passageway 34, the contaminants 50 can be attracted and retained against the magnet 42A, 42B itself or a surface 60 of the housing 14, for example, near the magnet 42A, 42B. In so doing, the trapped contaminants 50 are no longer free to move through the fluid 38 to locations that may be detrimental to operation of the damper 10.

Since minimizing a total weight of the damper 10 is important in some applications for a vehicle that it is employed on; use of conventional filters with media having sufficient area with small enough pore sizes to effectively remove potentially abrasive particles from the fluid may not be justifiable. The disclosed blade damper 10 provides a mechanism which prevents the magnetic contaminants 50 from freely moving within the fluid 38 to locations where they can be problematic without the added weight required of conventional media based filters.

Strategic placement of the magnets 42A, 42B within the cavity 18 and/or in or near the passageway 34 can facilitate trapping the magnetic contaminants 50 within the magnetic fields 46A, 46B. This is important since movement of the fluid 38, such as back and forth between the first chamber 26 and the second chamber 30, can act to stir the fluid 38 in a way that tends to hold the magnetic contaminants 50 in suspension within the fluid 38. In one embodiment a strategic placement includes locating one of the magnets 42A in a relatively low flow rate space near the passageway 34, and in a location where the centrifugal force experienced by the blade damper 10 help maintain the contaminants 50 on the magnets 42A, 42B. More specifically, locating the magnet 42A in a blind space 62A (FIG. 2) or 62B (FIG. 3) in fluidic communication with the passageway 34.

Figure 2:
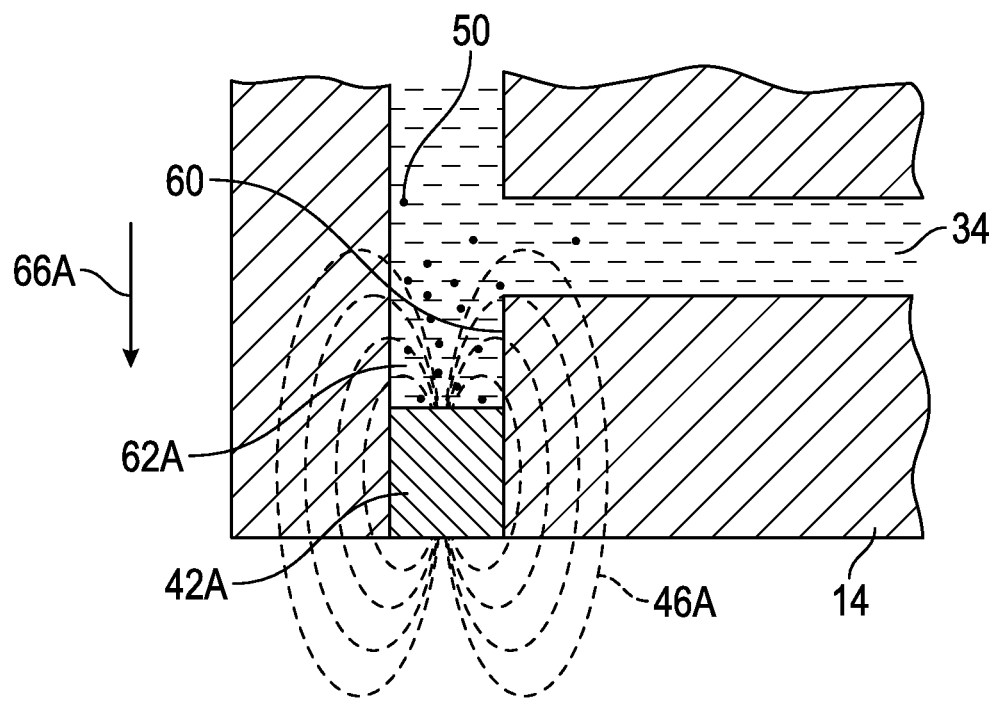
FIG. 2 depicts a partial cross sectional view of a portion of the blade damper of FIG. 1.

Referring to FIG. 2, additionally, the orientation of the blade damper 10 relative to motion of the blade damper 10 based on rotation thereof on a vehicle, for example, can provide even more aid to trapping the magnetic contaminants 50 in the magnetic field 46A. This orientation includes orienting the blade damper 10 such that centrifugal forces urge the fluid 38 and the contaminants 50 therein in a direction toward the magnet 42A. In applications wherein the magnetic contaminants 50 are more dense than the fluid 38 centrifugal forces acting in a direction of arrow 66A on the contaminants 50 will urge them to move through the fluid 38 toward the magnet 42A. It should be noted that an alternate embodiment employing a fluid that is more dense than the contaminants 50 would cause the contaminants 50 to move in a direction opposite to the embodiments illustrated herein. Positioning and orienting magnets on an opposite side of the damper 10 in such an embodiment would thus be called for. Regardless of the relative densities of the fluid 38 and the contaminants 50, once the contaminants 50 make contact against the magnet 42A directly or the surface 60 near the magnet 42A, the contaminants 50 may become trapped by the magnetic field 46A and prevented from continuing to move freely through the fluid 38.

Figure 3:
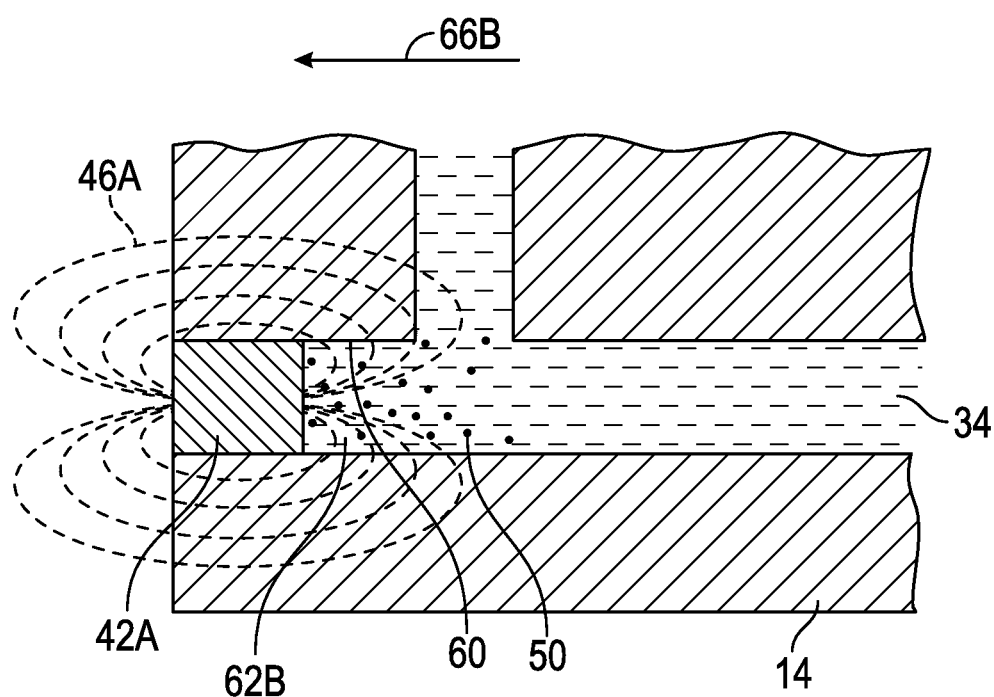
FIG. 3 depicts a partial cross sectional view of a portion of an alternative location for a magnet to be positioned within the blade damper of FIG. 1.

Referring to FIG. 3, an alternate location for placement of the magnet 42A within the blade damper 10 is illustrated. This location may be preferred in embodiments wherein centrifugal forces act in a direction of arrow 66B.

Referring again to FIG. 1, the magnet 42B is positioned at a location within the cavity 18 that experiences little if any movement of the fluid 38 such as a deadheaded blind space 62C. As with the magnet 42A, orienting the blade damper 10 relative to movement thereof such that the magnetic contaminants 50 are urged toward the magnet 42B in response to centrifugal forces acting in a direction of arrow 66C generated by rotation of the blade damper 10 will aid in moving the contaminants 50 toward the magnet 42B and into the magnetic field 46B.

It should be noted that a plurality of the magnets 42A, 42B can be used on a single one of the blade dampers 10. Installation of the magnets 42A, 42B can be via press fit, adhesive, crimping, threadable engagement or other means to structurally hold the magnet 42A, 42B relative to the blade damper 10 in the desired location.

Figure 4:
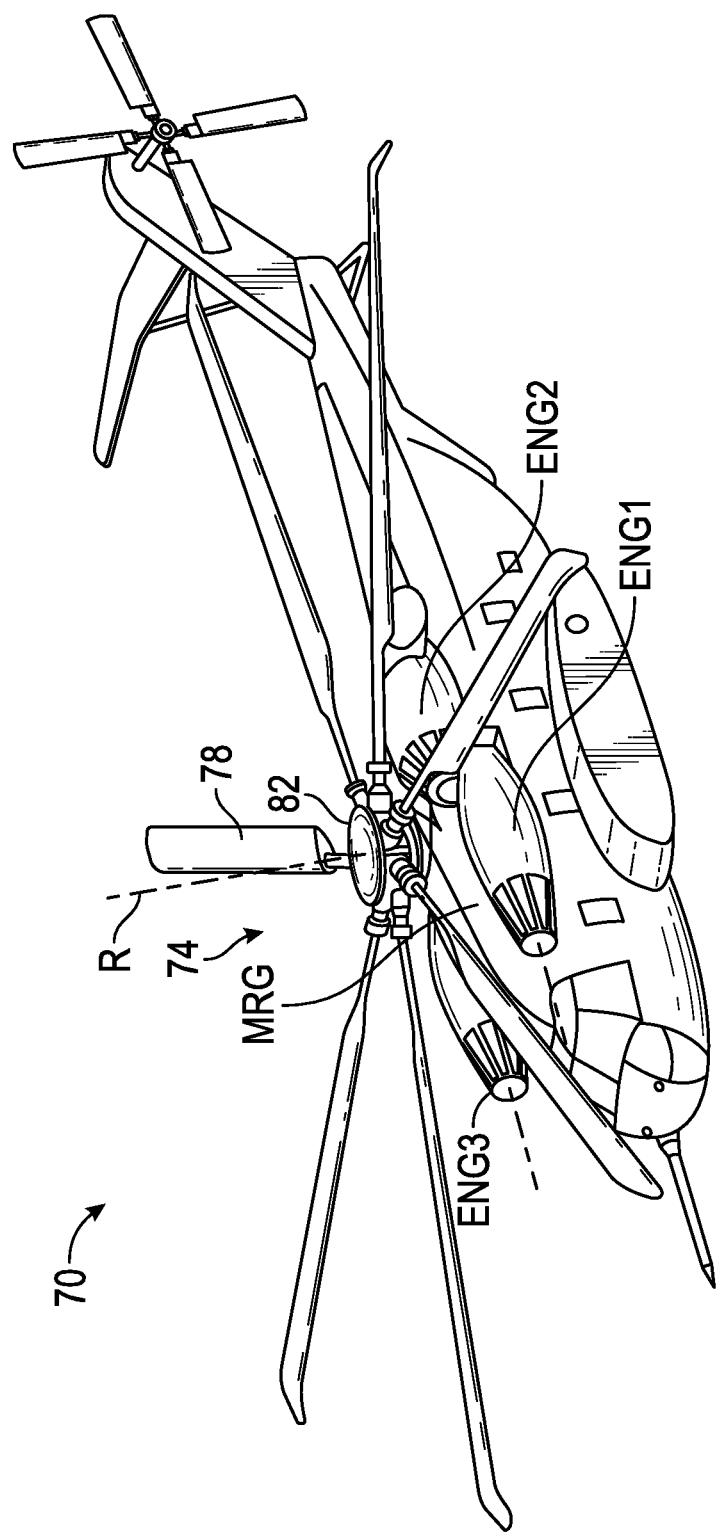
FIG. 4 depicts a helicopter using the blade damper according to an aspect of the invention.

Referring to FIG. 4 a helicopter 70 is illustrated using the blade damper 10 according to an aspect of the invention. The Figure schematically illustrates an exemplary vertical take-off and landing (VTOL) rotary-wing aircraft 70. The aircraft 70 in this non-limiting embodiment includes a main rotor assembly 74. The main rotor assembly 74 is driven about a rotor axis of rotation R through a main rotor gearbox MGR by one or more engines ENG (in this example, three engines ENG1-ENG3 are shown). The main rotor assembly 74 includes multiple rotor blade assemblies 78 mounted to a rotor hub 82. The damper 10 is part of the rotor hub 82. Each of the rotor blade assemblies 78 is attached to the rotor hub 82 in a way that let the blade assemblies 78 move independently of the others. The blade assemblies 78 are allowed to flap, feather, and lead or lag independently of each other. The dampers 10 are used to prevent excess lead and lag movement. Although a particular helicopter configuration is illustrated and described in this exemplary embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while shown in the context of a blade damper for use in a helicopter, it is understood that aspects could be used in other contexts where a damper is used in an environment experiencing centrifugal forces, such as in coaxial and convention helicopters, fixed wing aircraft, wind turbines, motor and marine vehicles without limitation. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A damper operating in a centrifugal environment creating a centrifugal force in a first direction, comprising:
a housing defining a cavity;
a piston in operable communication with the housing dividing the cavity into at least a first chamber and a second chamber;
a passageway in operable communication with the cavity configured to allow fluid within the cavity to move between the first chamber and the second chamber through the passageway;
at least one magnet in operable communication with fluid in at least one of the cavity and the passageway, such that magnetic contaminants are prevented from freely moving about within the fluid after having been attracted toward the at least one magnet by the centrifugal force and a magnetic field of the at least one magnet; and wherein the at least one magnet is positioned in a blind space out of a direct flow path through the passageway.

2. The damper operating in a centrifugal environment creating a centrifugal force in a first direction of claim 1, wherein the at least one magnet is positioned relative to the passageway such that the centrifugal forces due to movement of the blade damper urge the magnetic contaminants toward the at least one magnet.

3. The damper operating in a centrifugal environment creating a centrifugal force in a first direction of claim 1, wherein the at least one magnet is positioned within the cavity.

4. The damper operating in a centrifugal environment creating a centrifugal force in a first direction of claim 1, wherein the at least one magnet is positioned relative to the cavity such that centrifugal forces due to motion of the blade damper urge the magnetic contaminants toward the at least one magnet.

5. The damper operating in a centrifugal environment creating a centrifugal force in a first direction of claim 1, wherein one of the at least one magnet is positioned within the cavity and another of the at least one magnet is positioned in operable communication with the passageway.

6. The damper operating in a centrifugal environment creating a centrifugal force in a first direction of claim 1, wherein the at least one magnet is attached to the blade damper by at least one of press fit, adhesive bonding, crimping, and threadable engagement.

7. The damper operating in a centrifugal environment creating a centrifugal force in a first direction of claim 1, wherein a restriction within the passageway slows a fluid flow rate through the passageway.

8. The damper operating in a centrifugal environment creating a centrifugal force in a first direction of claim 1, wherein the magnetic contaminants are primarily formed by wear due to relative motion between components within the blade damper.

9. The damper operating in a centrifugal environment creating a centrifugal force in a first direction of claim 1, wherein seals sealingly engage the piston to the housing.

10. A helicopter comprising:
    a plurality of blade assemblies; and
    a rotor hub having one of the dampers of claim 1 in operable communication with each of the plurality of blade assemblies.

11. The helicopter of claim 10, further comprising:
    a rotor assembly comprising the plurality of blade assemblies and the rotor hub.

12. The helicopter of claim 11, further comprising:
    at least one engine; and
    a gear box in operable communication with the at least one engine and the rotor assembly.

* * * * *